US009411694B2

(12) United States Patent
Pawlowski

(10) Patent No.: US 9,411,694 B2
(45) Date of Patent: Aug. 9, 2016

(54) CORRECTING RECURRING ERRORS IN MEMORY

(71) Applicant: Micron Technology, Inc., Boise, ID (US)

(72) Inventor: J. Thomas Pawlowski, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 123 days.

(21) Appl. No.: 14/178,867

(22) Filed: Feb. 12, 2014

(65) Prior Publication Data

US 2015/0227441 A1 Aug. 13, 2015

(51) Int. Cl.
*G06F 11/00* (2006.01)
*G06F 11/16* (2006.01)

(52) U.S. Cl.
CPC ........ *G06F 11/1658* (2013.01); *G06F 2201/82* (2013.01)

(58) Field of Classification Search
CPC ...................................................... G11C 29/00
See application file for complete search history.

(56) References Cited

U.S. PATENT DOCUMENTS

| | | | | |
|---|---|---|---|---|
| 4,791,622 A * | 12/1988 | Clay | ................... | G11B 7/0045 360/27 |
| 6,992,937 B2 * | 1/2006 | Tran et al. | ..................... | 365/200 |
| 8,464,106 B2 * | 6/2013 | Filor et al. | ..................... | 714/723 |
| 8,874,958 B2 * | 10/2014 | Gilbert | .......................... | 714/6.22 |
| 2006/0085670 A1 * | 4/2006 | Carver et al. | ..................... | 714/5 |
| 2011/0289349 A1 * | 11/2011 | Loeser et al. | ..................... | 714/6.24 |
| 2012/0072786 A1 * | 3/2012 | Bahali et al. | .................... | 714/704 |
| 2013/0151912 A1 * | 6/2013 | Sevugapandian | ...... | G06F 11/006 714/704 |
| 2015/0074493 A1 * | 3/2015 | Kajigaya | ...................... | 714/764 |
| 2015/0149864 A1 * | 5/2015 | Kim | ...................... | G06F 11/102 714/766 |
| 2015/0186198 A1 * | 7/2015 | Dong | ..................... | G06F 11/076 714/706 |
| 2015/0199233 A1 * | 7/2015 | Pelley | ................. | G06F 11/1076 714/764 |
| 2015/0242269 A1 * | 8/2015 | Pelley | ................. | G06F 11/1048 714/764 |
| 2016/0063170 A1 * | 3/2016 | Lin | ..................... | G06F 17/5081 716/52 |

* cited by examiner

*Primary Examiner* — Amine Riad

(74) *Attorney, Agent, or Firm* — Brooks, Cameron & Huebsch, PLLC

(57) ABSTRACT

The present disclosure includes apparatuses and methods for correcting recurring errors in memory. A number of embodiments include determining whether a first subset of a group of memory cells has a recurring error associated therewith using a second subset of the group of memory cells, and responsive to a determination that the first subset of the group of memory cells has a recurring error associated therewith, correcting the recurring error using the second subset of the group of memory cells.

25 Claims, 4 Drawing Sheets

CORRECTING RECURRING ERRORS IN MEMORY

TECHNICAL FIELD

The present disclosure relates generally to semiconductor memory and methods, and more particularly, to correcting recurring errors in memory.

BACKGROUND

Memory devices are typically provided as internal, semiconductor, integrated circuits and/or external removable devices in computers or other electronic devices. There are many different types of memory including volatile and non-volatile memory. Volatile memory can require power to maintain its data and can include random-access memory (RAM), dynamic random access memory (DRAM), and synchronous dynamic random access memory (SDRAM), among others. Non-volatile memory can retain stored data when not powered and can include NAND flash memory, NOR flash memory, phase change random access memory (PCRAM), resistive random access memory (RRAM), and magnetic random access memory (MRAM), among others.

Memory devices can be combined together to form a solid state drive (SSD). An SSD can include non-volatile memory (e.g., NAND flash memory and/or NOR flash memory), and/or can include volatile memory (e.g., DRAM and/or SRAM), among various other types of non-volatile and volatile memory. DRAM devices can include memory cells storing data in a charge storage structure such as a capacitor, for instance, and may be utilized as volatile memory for a wide range of electronic applications.

Memory cells (e.g., DRAM cells) in an array architecture can be programmed to a target (e.g., desired) state. For instance, electric charge can be placed on or removed from the charge storage structure (e.g., capacitor) of a memory cell to program the cell to a particular data state.

For example, a single level cell (SLC) can be programmed to a targeted one of two different data states, which can be represented by the binary units 1 or 0. Some memory cells can be programmed to a targeted one of more than two data states (e.g., 1111, 0111, 0011, 1011, 1001, 0001, 0101, 1101, 1100, 0100, 0000, 1000, 1010, 0010, 0110, and 1110). Such cells may be referred to as multi state memory cells, multiunit cells, or multilevel cells (MLCs). MLCs can provide higher density memories without increasing the number of memory cells since each cell can represent more than one digit (e.g., more than one bit).

A state of a memory cell (e.g., a DRAM cell) can be determined by sensing the stored charge on the charge storage structure (e.g., capacitor) of the cell. However, a number of mechanisms, such as charge loss (e.g., charge leakage), for example, can cause the stored charge of the memory cell to change. As a result of the change in the stored charge, a recurring error may occur when the state of the cell is sensed. For example, the cell may repeatedly be sensed to be in a state other than the target state (e.g., a state different than the state to which the cell was programmed). Resolving recurring errors can consume finite error correction code (ECC) resources.

DETAILED DESCRIPTION

Figure 1:
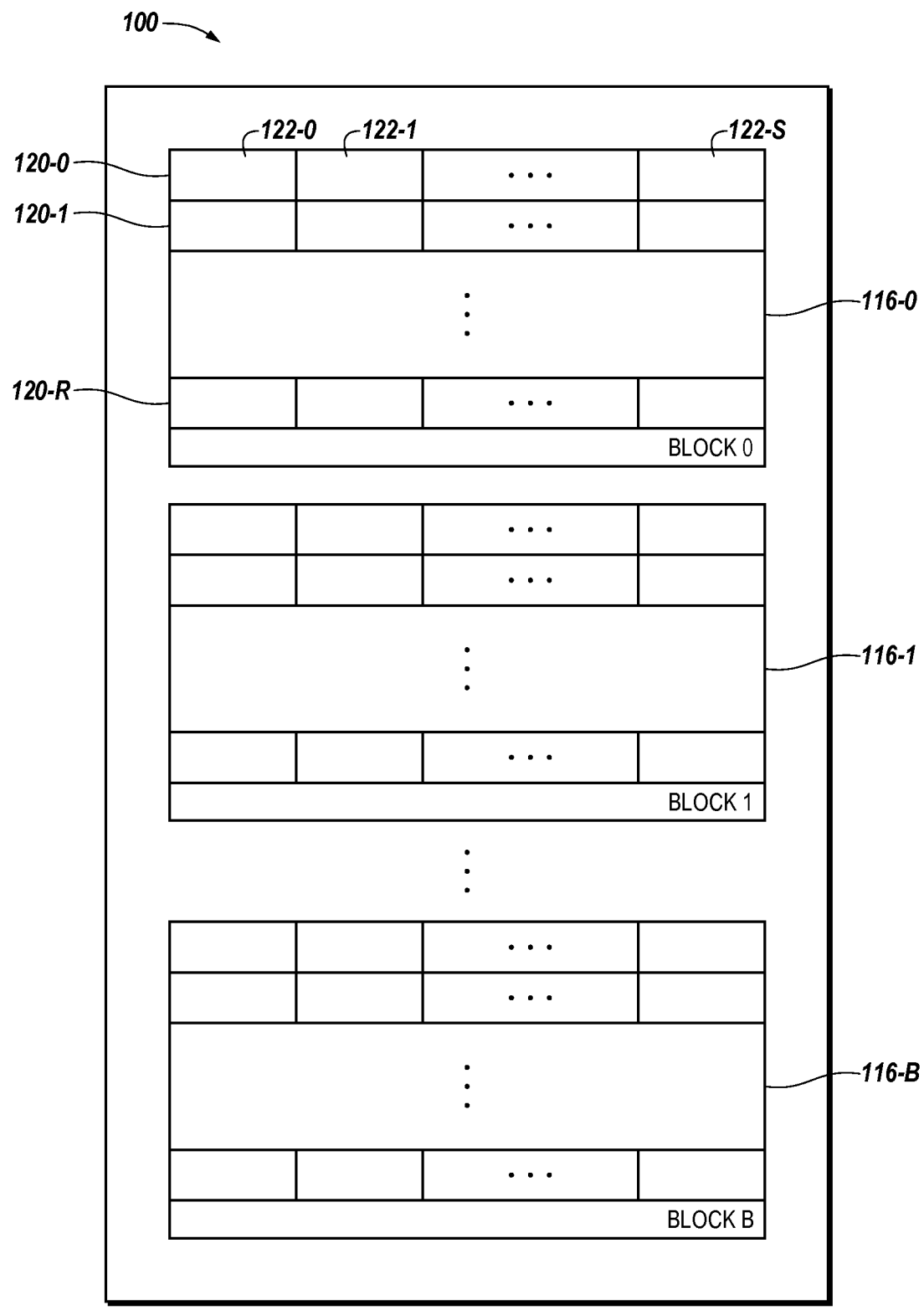
FIG. 1 illustrates a diagram of a portion of a memory array having a number of physical blocks in accordance with a number of embodiments of the present disclosure.

The present disclosure includes apparatuses and methods for correcting recurring errors in memory. A number of embodiments include determining whether a first subset of a group of memory cells has a recurring error associated therewith using a second subset of the group of memory cells, and responsive to a determination that the first subset of the group of memory cells has a recurring error associated therewith, correcting the recurring error using the second subset of the group of memory cells.

Embodiments of the present disclosure can correct recurring errors in memory caused by, for example, charge loss (e.g., charge leakage), among other mechanisms. Correcting recurring errors in memory in accordance with embodiments of the present disclosure can reduce the size, reduce the complexity, and/or increase the performance (e.g., increase the speed, increase the reliability, and/or decrease the power consumption) of the memory, among other benefits. For example, embodiments of the present disclosure can correct recurring errors in memory without using a conventional error correction code (ECC) scheme (e.g., a single error correct double error detect (SECDED) ECC scheme), thereby freeing the resources of the conventional ECC scheme to correct non-recurring (e.g., one-time) errors in the memory.

Further, previous error correction approaches (e.g., schemes) may only be able to correct a single error in a block of data, and accordingly if a second error occurs in the block it may not be corrected, which can lead to failure of the memory. In contrast, embodiments of the present disclosure can detect and correct a recurring error (e.g., substitute the errant bit value with the correct bit value), which can free up the error correction scheme to correct another error.

As used herein, "a number of" something can refer to one or more such things. For example, a number of memory cells can refer to one or more memory cells. Additionally, the designators "B", "R", and "S", as used herein, particularly with respect to reference numerals in the drawings, indicates that a number of the particular feature so designated can be included with a number of embodiments of the present disclosure.

The figures herein follow a numbering convention in which the first digit or digits correspond to the drawing figure number and the remaining digits identify an element or component in the drawing. Similar elements or components between different figures may be identified by the use of similar digits. For example, 100 may reference element "00" in FIG. 1, and a similar element may be referenced as 200 in FIG. 2.

FIG. 1 illustrates a diagram of a portion of a memory array 100 having a number of physical blocks in accordance with a number of embodiments of the present disclosure. Memory array 100 can be, for example, a DRAM array. However, embodiments of the present disclosure are not limited to a particular type of memory or memory array. For example, memory array 100 can be a NAND flash array, an RRAM array, or a PCRAM array, among other types of memory arrays. Further, although not shown in FIG. 1, one of ordinary skill in the art will appreciate that memory array 100 can be located on a particular semiconductor die along with various peripheral circuitry associated with the operation thereof.

As shown in FIG. 1, memory array 100 has a number of physical blocks 116-0 (BLOCK 0), 116-1 (BLOCK 1), . . . , 116-B (BLOCK B) of memory cells. The memory cells can be single level cells and/or multilevel cells. As an example, the number of physical blocks in memory array 100 may be 128 blocks, 512 blocks, or 1,024 blocks, but embodiments are not limited to a particular multiple of 128 or to any particular number of physical blocks in memory array 100.

A number of physical blocks of memory cells (e.g., blocks 116-0, 116-1, . . . , 116-B) can be included in a plane of memory cells, and a number of planes of memory cells can be included on a die. For instance, in the example shown in FIG. 1, each physical block 116-0, 116-1, . . . , 116-B can be part of a single die. That is, the portion of memory array 100 illustrated in FIG. 1 can be die of memory cells.

As shown in FIG. 1, each physical block 116-0, 116-1, . . . , 116-B contains a number of physical rows (e.g., 120-0, 120-1, . . . , 120-R) of memory cells coupled to access lines (e.g., word lines). The number of rows (e.g., word lines) in each physical block can be 32, but embodiments are not limited to a particular number of rows 120-0, 120-1, . . . , 120-R per physical block. Further, although not shown in FIG. 1, the memory cells can be coupled to sense lines (e.g., data lines and/or digit lines).

As one of ordinary skill in the art will appreciate, each row 120-0, 120-1, . . . , 120-R can include a number of pages of memory cells (e.g., physical pages). A physical page refers to a unit of programming and/or sensing (e.g., a number of memory cells that are programmed and/or sensed together as a functional group). In the embodiment shown in FIG. 1, each row 120-0, 120-1, . . . , 120-R comprises one physical page of memory cells. However, embodiments of the present disclosure are not so limited. For instance, in a number of embodiments, each row can comprise multiple physical pages of memory cells (e.g., one or more even pages of memory cells coupled to even-numbered bit lines, and one or more odd pages of memory cells coupled to odd numbered bit lines). Additionally, for embodiments including multilevel cells, a physical page of memory cells can store multiple pages (e.g., logical pages) of data (e.g., an upper page of data and a lower page of data, with each cell in a physical page storing one or more bits towards an upper page of data and one or more bits towards a lower page of data).

In a number of embodiments of the present disclosure, and as shown in FIG. 1, a page of memory cells can comprise a number of physical sectors 122-0, 122-1, . . . , 122-S (e.g., subsets of memory cells). Each physical sector 122-0, 122-1, . . . , 122-S of cells can store a number of logical sectors of data (e.g., data words). Additionally, each logical sector of data can correspond to a portion of a particular page of data. As an example, a first logical sector of data stored in a particular physical sector can correspond to a logical sector corresponding to a first page of data, and a second logical sector of data stored in the particular physical sector can correspond to a second page of data. Each physical sector 122-0, 122-1, . . . , 122-S, can store system and/or user data, and/or can include overhead data, such as error correction code (ECC) data, logical block address (LBA) data, and recurring error data, as will be further described herein. For instance, in a number of embodiments, a group of cells (e.g., a page) can comprise a number of physical sectors storing user data (e.g., data words), as well as a number of physical sectors storing ECC data and/or recurring error data, as will be further described herein.

Logical block addressing is a scheme that can be used by a host for identifying a logical sector of data. For example, each logical sector can correspond to a unique logical block address (LBA). Additionally, an LBA may also correspond to a physical address. A logical sector of data can be a number of bytes of data (e.g., 512 bytes). However, embodiments are not limited to these examples.

It is noted that other configurations for the physical blocks 116-0, 116-1, . . . , 116-B, rows 120-0, 120-1, . . . , 120-R, sectors 122-0, 122-1, . . . , 122-S, and pages are possible. For example, rows 120-0, 120-1, . . . , 120-R of physical blocks 116-0, 116-1, . . . , 116-B can each store data corresponding to a single logical sector which can include, for example, more or less than 512 bytes of data.

Figure 2:
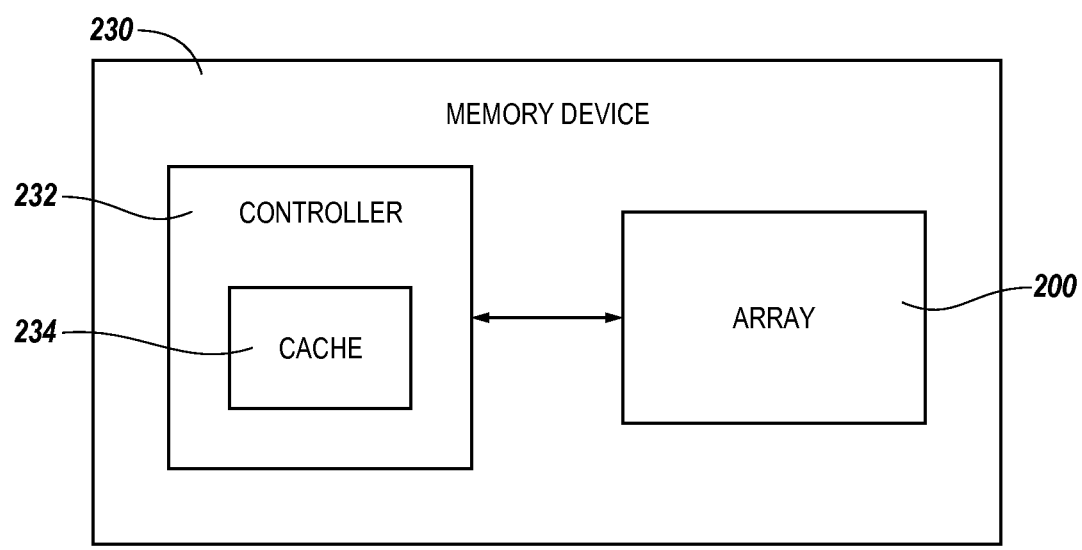
FIG. 2 illustrates a block diagram of an apparatus in the form of a memory device in accordance with a number of embodiments of the present disclosure.

FIG. 2 illustrates a block diagram of an apparatus in the form of a memory device 230 in accordance with a number of embodiments of the present disclosure. As used herein, an "apparatus" can refer to, but is not limited to, any of a variety of structures or combinations of structures, such as a circuit or circuitry, a die or dice, a module or modules, a device or devices, or a system or systems, for example.

As shown in FIG. 2, memory device 230 includes a controller 232 coupled to a memory array 200. Memory array 200 can be, for example, memory array 100 previously described in connection with FIG. 1. Although one memory array is shown in FIG. 2, embodiments of the present disclosure are not so limited (e.g., memory device 230 can include more than one memory array coupled to controller 232).

Memory array 200 can include a number of groups of memory cells, and each of the number of groups can include a number of subsets of memory cells. For example, memory array 200 can include a number of pages (e.g., physical pages) of memory cells, and each of the number of pages can include a number of (e.g., 32) sectors (e.g., physical sectors) of memory cells, as previously described in connection with FIG. 1.

In a number of embodiments, a particular one of the subsets of memory cells in each of the number of groups can be used to store error correction code (ECC) data and recurring error data corresponding to the other subsets of memory cells in each respective group used to store system and/or user data. The ECC data stored in the particular subset of a given group can include ECC data for each of the number of subsets in that group, including the particular subset. The recurring error data stored in the particular subset of a given group can include data indicating a quantity of recurring errors associated with (e.g., occurring in) that group, and data about each of the recurring errors associated with that group. The data about each of the recurring errors associated with a respective group can include data indicating which particular subset of that group has that respective recurring error associated therewith, which data stored (e.g., a bit location) in that subset has that respective recurring error, and the correct value (e.g., correct bit value) for the data stored in that subset having that respective recurring error.

As used herein, an error can refer to an instance in which a memory cell is sensed to be in a state other (e.g., different) than the target state to which the cell was programmed. That is, data stored in a memory cell can be referred to as erroneous if the sensed (e.g., read) data (e.g., bit value) is different than the data value corresponding to the state to which the cell was programmed. Further, as used herein, a recurring (e.g., hard)

error can refer to an error that repeats (e.g., two or more times) during operation of the memory. Recurring errors can be caused by, for instance, memory cells that become defective as a result of charge loss (e.g., charge leakage), for example. In contrast, non-recurring (e.g., soft) errors, as used herein, can refer to errors that do not repeat (e.g., occur randomly) during operation of the memory.

Figure 4A:
FIG. 4A is a table illustrating an example of the data allocation of the subsets of a group of memory cells in accordance with a number of embodiments of the present disclosure.

FIG. 4A is a table 470 illustrating an example of the data allocation (e.g., bit allocation) of the subsets of a group of memory cells in accordance with a number of embodiments of the present disclosure. The group of memory cells can be, for example, a page (e.g., a physical page) of memory cells, and the subsets can be, for example, sectors (e.g., physical sectors) of memory cells.

In the example illustrated in FIG. 4A, the group of memory cells includes 32 subsets of memory cells, and each subset can store 512 bits of data. As such, the 32 subsets of memory cells can correspond to 16,384 bits (e.g., 512×32). As shown in FIG. 1, the first subset (e.g., data subset 0) starts at bit location (e.g., number) 0, the second subset (e.g., data subset 1) starts at bit location 512, the third subset (e.g., data subset 2) starts at bit location 1024, and so on, up to the $32^{nd}$ subset (e.g., data subset 31), which starts at bit location 15872.

In a number of embodiments, a particular one of the subsets of the group of memory cells can store ECC data and recurring error data corresponding to the other subsets of the group, which can store system and/or user data, for example. In the example illustrated in FIG. 4A, data subset 0 through data subset 30 store system and/or user data (e.g., data words), and data subset 31 stores ECC data and recurring error data corresponding to data subsets 0 through 30.

Figure 4B:
FIG. 4B is a table illustrating an example of the allocation of the data stored in a particular subset of a group of memory cells in accordance with a number of embodiments of the present disclosure.

FIG. 4B is a table 472 illustrating an example of the allocation of the ECC data and recurring error data stored in data subset 31 shown in FIG. 4A. As shown in FIG. 4B, the ECC data stored in data subset 31 can include 11 bits of ECC data (e.g., 11 ECC parity bits) for each of the 32 subsets of memory cells of the group, including data subset 34. For instance, as shown in FIG. 4B, the ECC data for data subset 0 starts at bit location 15872 (e.g., the first bit of data subset 31), the ECC data for data subset 1 starts at bit location 15883, the ECC data for data subset 2 starts at bit location 15894, and so on, up to the ECC data for data subset 31, which starts at bit location 16213 in this example. The 11 bits of ECC data for each of the subsets can include one bit for detecting an error in that respective subset, and ten bits for correcting the error. For instance, the one bit can be a parity bit that indicates if there is an odd number (e.g., 1 bit, 3 bits, 5 bits, etc.) of errors. This bit can be optional, and can be incorporated to provide a notification of errors that may exceed the code's correction capabilities. The other ten bits can be a Hamming Single-Error-Correct code, which can indicate a single bit error in the data subset. However, embodiments of the present disclosure are not limited to a particular number of bits of ECC data for each of the subsets. For example, the number of bits of ECC data for each of the subsets can be more or less than 11, depending on the type of ECC algorithm used to detect and correct the errors, and/or the amount of data stored in the subsets. For instance, in some embodiments, the ECC data may not include the single bit that indicates the code's correction capabilities are exceeded (e.g., the ECC data may include only the ten Hamming Single-Error-Correct code bits).

As shown in FIG. 4B, the recurring error data stored in data subset 31 can include 4 bits of data, starting at bit location 16224, indicating the quantity of recurring errors associated with (e.g., occurring in) the group. In the example illustrated in FIG. 4B, the quantity of recurring errors associated with the group can be between zero to ten, inclusive. That is, data subset 31 can be used to correct up to ten recurring errors associated with the group. However, embodiments of the present disclosure are not limited to a particular recurring error quantity. For example, data subset 31 can be used to correct up to more or less than ten recurring errors associated with the group, depending on the amount of data in data subset 31 available to do so (e.g., on the amount of data in data subset 31 not being used for ECC data).

As shown in FIG. 4B, the recurring error data stored in data subset 31 can also include 15 bits of data that can be used to describe details about each of a number of recurring errors associated with the group. For instance, as shown in FIG. 4B, the data about a first recurring error (e.g., recurring error 1) associated with the group can start at bit location 16228, the data about a second recurring error (e.g., recurring error 2) associated with the group can start at bit location 16243, and so on, up to the data about a tenth recurring error (e.g., recurring error 10) associated with the group, which can start at bit location 16363. The 15 bits of data about each of the recurring errors can include five bits (e.g., $2^5$) indicating which subset (e.g., the subset number) of the group has that respective error associated therewith, nine bits (e.g., $2^9$) indicating which data (e.g., the bit location) stored in that subset has that respective recurring error, and one bit (e.g., $2^1$) indicating the correct value (e.g., the correct bit value) for that data. However, embodiments of the present disclosure are not limited to a particular amount of data about each of the recurring errors. For example, the amount of data about each of the recurring errors can be more or less than 15 bits, depending on the quantity of subsets in the group, and/or the amount of data stored in each of the subsets.

As shown in FIG. 4B, data subset 31 may also include a spare area starting at bit location 16378. That is, the remaining six bits of data subset 31 may be unused (e.g., may not be used to store system and/or user data, and/or overhead data).

In a number of embodiments, the recurring error data and/or the ECC data corresponding to a group of memory cells, and stored in a particular subset of the group, can be read from memory array 200 and stored in a cache associated with memory device 230, such as, for example, cache 234 in controller 232 (e.g., the memory of controller 232) illustrated in FIG. 2. Storing the data stored in the particular subset of cells in a cache (e.g., cache 234) can reduce or eliminate the need to read that data from memory array 200, which can increase the performance (e.g., increase the speed, increase the reliability, and/or decrease the power consumption) of memory device 230.

Controller 232 can include, for example, control circuitry and/or logic (e.g., hardware and/or firmware). Controller 232 can be included on the same physical device (e.g., the same die) as memory array 200, or can be included on a separate physical device that is communicatively coupled to the physical device that includes memory array 200. In a number of embodiments, components of controller 232 can be spread across multiple physical devices (e.g., some components on the same die as the array, and some components on a different die, module, or board) as a distributed controller.

Controller 232 can detect and correct recurring errors in memory array 200. For example, controller 232 can determine whether a first subset (e.g., sector) of one of the groups (e.g., pages) of memory cells of memory array 200 has a recurring error associated therewith using a second subset of that group of memory cells. That is, controller 232 can determine whether the data stored in the memory cells of the first subset has a recurring error using the data stored in the memory cells of the second subset. The first subset of memory cells can be one of the subsets of that group that stores system and/or user data, and the second subset of memory cells can be the particular subset of that group that stores ECC data and recurring error data. The ECC data can be data used to correct non-recurring errors in each of the subsets of the group (e.g., as part of an ECC operation), and the recurring error data can be data in addition to (e.g., separate from) the ECC data that can be used to correct recurring errors in each of the subsets of the group. That is, the recurring error data, rather than the ECC data, can be used to correct recurring errors in each of the subsets, as part of an operation that is separate from an ECC operation.

Controller 232 can determine whether the first subset of the group of memory cells has a recurring error associated therewith using the recurring error data stored in the second subset of the group of memory cells. For example, if the recurring error data indicates that the quantity of recurring errors associated with the group of memory cells is non-zero, and that the first subset of the group has one of those recurring errors associated therewith, controller 232 can determine that a recurring error is associated with the first subset.

Responsive to a determination that the first subset of the group of memory cells has a recurring error associated therewith (e.g., if the data stored in the memory cells of the first subset has a recurring error), controller 232 can correct the recurring error using the second subset of the group of memory cells (e.g., using the data stored in the memory cells of the second subset). For example, responsive to a determination that the first subset of the group has a recurring error associated therewith, controller 232 can determine which memory cell in the first subset has the recurring error associated therewith (e.g., which of the data stored in the first subset has the recurring error) using the second subset, and correct the data value stored in the memory cell in the first subset having the recurring error associated therewith (e.g., determine the correct value of the data stored in the first subset having the recurring error, and change the data stored in the first subset having the recurring error to the correct value) using the second subset.

Controller 232 can correct the recurring error associated with the first subset of the group of memory cells using the data about that recurring error stored in the second subset of the group of memory cells. For example, the data about that recurring error stored in the second subset can indicate to controller 232 which data stored in the first subset has that recurring error, and the correct value for the data stored in the first subset having that recurring error.

After correcting the recurring error associated with the first subset of the group of memory cells, controller 232 can correct any non-recurring (e.g., one-time) errors associated with the first subset (e.g., any non-recurring errors in the data stored in the memory cells of the first subset) using the second subset of the group of memory cells (e.g., using the data stored in the memory cells of the second subset). For example, controller 232 can correct the non-recurring error(s) associated with the first subset using the ECC data for the first subset stored in the second subset.

Controller 232 can detect and correct recurring errors in the other subsets of the group of memory cells, and/or in the subsets of the other groups of memory cells, of memory array 200 in an analogous manner. For example, controller 232 can determine whether a third subset (e.g., another one of the subsets that stores system and/or user data) of the group of memory cells has a recurring error associated therewith using the second subset of the group of memory cells in a manner analogous to that described for the first subset of the group of memory cells. Responsive to a determination that the third subset has a recurring error associated therewith, controller 232 can correct the recurring error using the second subset in a manner analogous to that described for the first subset. Further, after correcting the recurring error associated with the third subset, controller 232 can correct any non-recurring errors associated with the third subset using the second subset in a manner analogous to that described for the first subset.

The embodiment illustrated in FIG. 2 can include additional circuitry, logic, and/or components not illustrated so as not to obscure embodiments of the present disclosure. For example, memory device 230 can include address circuitry to latch address signals provided over I/O connectors through I/O circuitry. Address signals can be received and decoded by a row decoder and a column decoder, to access memory array 200.

Figure 3:
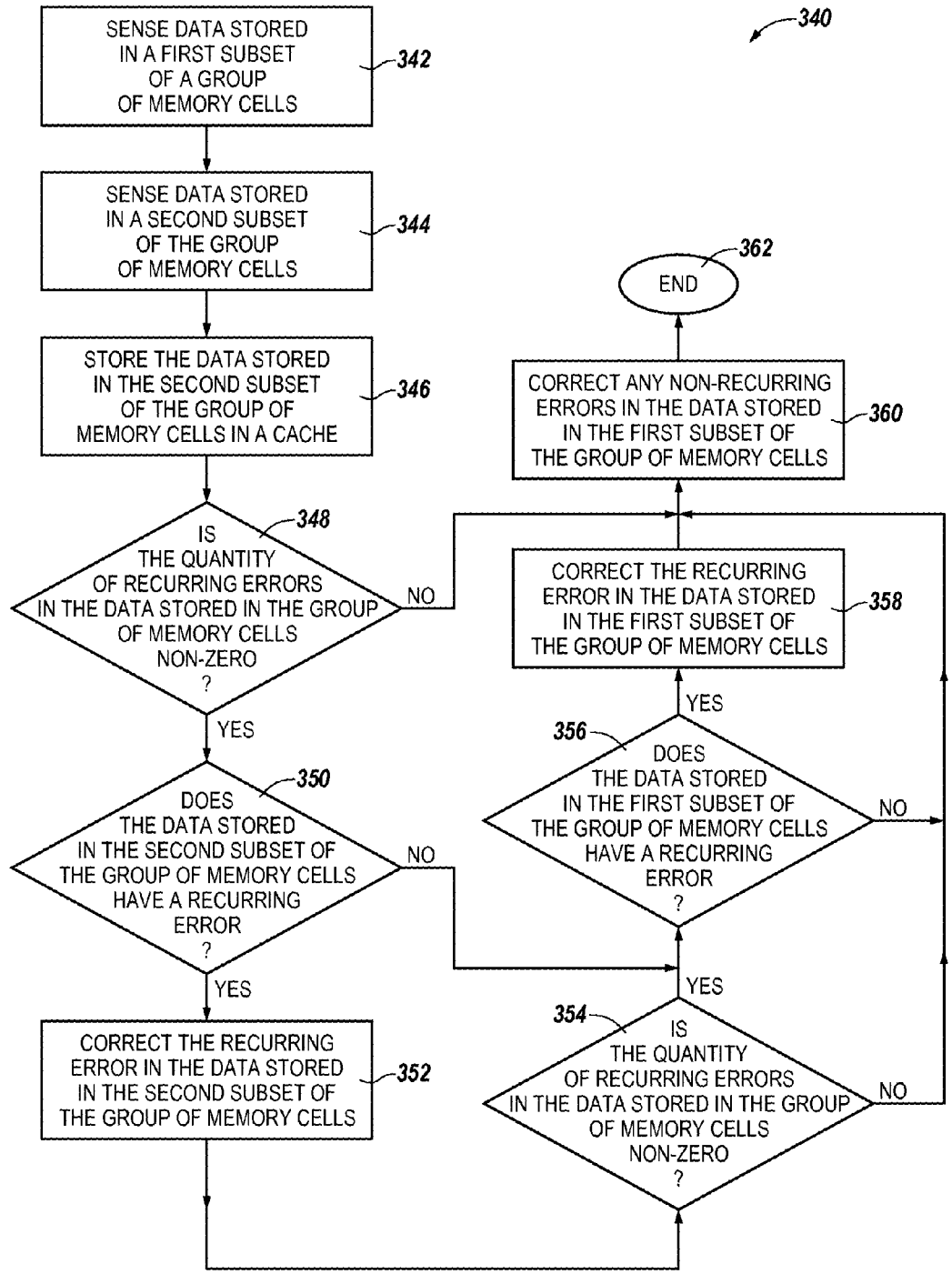
FIG. 3 illustrates a method for operating memory in accordance with a number of embodiments of the present disclosure.

FIG. 3 illustrates a method 340 for operating memory in accordance with a number of embodiments of the present disclosure. Method 340 can be performed by a controller such as, for example, controller 232 previously described in connection with FIG. 2.

At block 342, method 340 includes sensing data stored in a first subset of a group of memory cells. The group of memory cells can be, for example, a page of memory cells of memory array 200 previously described in connection with FIG. 2, and the first subset of the group can be, for example, a first sector of the page. The first subset can store system and/or user data.

At block 344, method 340 includes sensing data stored in a second subset of the group of memory cells. The second subset of the group can be, for example, a second sector of the group (e.g., page). The second subset can store ECC data and recurring error data for the group, and can be the only subset of the group to store ECC data and recurring error data in a number of embodiments. The recurring error data for the group can include, for example, data indicating a quantity of recurring errors associated with (e.g., occurring in) the group, and data about each of the recurring errors associated with the group (e.g., data indicating which subset of the group has that respective recurring error associated therewith, which data stored in that subset has that respective recurring error, and the correct value for the data having that respective recurring error), as previously described herein (e.g., in connection with FIG. 2).

At block 346, method 340 includes storing the data stored in the second subset of the group of memory cells in a cache. The cache can be, for example, cache 234 previously described in connection with FIG. 2. Storing the data stored in the second subset of the group in the cache can reduce or eliminate the need to further sense that data (e.g., can reduce or eliminate the need to perform block 344 of method 340), which can increase the performance of the memory, as previously described herein (e.g., in connection with FIG. 2).

At block 348, method 340 includes determining whether the quantity of recurring errors in the data stored in the group (e.g., in all subsets of the group) of memory cells is non-zero. This determination can be made using the recurring error data for the group (e.g., the data indicating the quantity of recurring errors associated with the group) stored in the second subset of the group.

In the example shown in FIG. 3, if it is determined that the quantity of recurring errors in the data stored in the group of memory cells is not non-zero (e.g., if the quantity of recurring errors in the data stored in the group is zero), method 340 proceeds to block 360. If it is determined that the quantity of recurring errors in the data stored in the group of memory cells is non-zero, then it is determined whether the data stored in the second subset of the group has a recurring error at block 350. This determination can be made using the recurring error data for the group (e.g., the data about each of the recurring errors associated with the group) stored in the second subset of the group. For example, the recurring error data for the group stored in the second subset can indicate whether the second subset is one of the subsets of the group having a recurring error associated therewith (e.g., whether one of the recurring errors occurring in the group is associated with the second subset).

In the example shown in FIG. 3, if it is determined that the data stored in the second subset of the group of memory cells does not have a recurring error, method 340 proceeds to block 356. If it is determined that the data stored in the second subset of the group has a recurring error, the recurring error is corrected at block 352. The recurring error can be corrected using the recurring error data for the group (e.g., the data about each of the recurring errors associated with the group) stored in the second subset of the group. For example, the recurring error data for the group stored in the second subset can indicate which data stored in the second subset has the recurring error, and the correct value for that data. Further, the recurring error data for the group (e.g., the data indicating the quantity of recurring errors associated with the group) can be updated to reflect that the recurring error has been corrected.

At block 354, method 340 includes determining whether the quantity of recurring errors in the data stored in the group (e.g., in all subsets of the group) of memory cells is non-zero. This determination can be made using the recurring error data for the group (e.g., the updated data indicating the quantity of recurring errors associated with the group) stored in the second subset of the group.

In the example shown in FIG. 3, if it is determined at block 354 that the quantity of recurring errors in the data stored in the group of memory cells is not non-zero (e.g., if the quantity of recurring errors in the data stored in the group is zero), method 340 proceeds to block 360. If it is determined at block 354 that the quantity of recurring errors in the data stored in the group of memory cells is non-zero, then it is determined whether the data stored in the first subset of the group has a recurring error at block 356. This determination can be made using the recurring error data for the group (e.g., the data about each of the recurring errors associated with the group) stored in the second subset of the group. For example, the recurring error data for the group stored in the second subset can indicate whether the first subset is one of the subsets of the group having a recurring error associated therewith (e.g., whether one of the recurring errors occurring in the group is associated with the first subset).

In the example shown in FIG. 3, if it is determined that the data stored in the first subset of the group of memory cells does not have a recurring error, method 340 proceeds to block 360. If it is determined that the data stored in the first subset of the group has a recurring error, the recurring error in the data stored in the first subset of the group is corrected at block 358. The recurring error can be corrected using the recurring error data for the group (e.g., the data about each of the recurring errors associated with the group) stored in the second subset of the group. For example, the recurring error data for the group stored in the second subset can indicate which data stored in the first subset has the recurring error, and the correct value for that data. Further, the recurring error data for the group (e.g., the data indicating the quantity of recurring errors associated with the group) can be updated to reflect that the recurring error has been corrected.

At block 360, method 340 includes correcting any non-recurring (e.g., one-time) errors in the data stored in the first subset of the group of memory cells. The non-recurring errors can be corrected using the ECC data stored in the second subset of the group of memory cells.

In the example shown in FIG. 3, method 340 proceeds to end at block 362. However, in a number of embodiments, method 340 can be repeated for a number of other subsets of the group of memory cells (e.g., other subsets that store system and/or user data) before ending at block 362.

Although specific embodiments have been illustrated and described herein, those of ordinary skill in the art will appreciate that an arrangement calculated to achieve the same results can be substituted for the specific embodiments shown. This disclosure is intended to cover adaptations or variations of a number of embodiments of the present disclosure. It is to be understood that the above description has been made in an illustrative fashion, and not a restrictive one. Combination of the above embodiments, and other embodiments not specifically described herein will be apparent to those of ordinary skill in the art upon reviewing the above description. The scope of a number of embodiments of the present disclosure includes other applications in which the above structures and methods are used. Therefore, the scope of a number of embodiments of the present disclosure should be determined with reference to the appended claims, along with the full range of equivalents to which such claims are entitled.

In the foregoing Detailed Description, some features are grouped together in a single embodiment for the purpose of streamlining the disclosure. This method of disclosure is not to be interpreted as reflecting an intention that the disclosed embodiments of the present disclosure have to use more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A method for operating a group of memory cells having a number of subsets of memory cells, comprising:
   determining whether a second subset of a group of memory cells has a recurring error associated therewith using the second subset of the group of memory cells;
   responsive to a determination that the second subset of the group of memory cells has a recurring error associated therewith, correcting the recurring error using recurring error data for the group stored in the second subset of the group of memory cells;
   determining whether a first subset of the group of memory cells has a recurring error associated therewith using the recurring error data for the group stored in the second subset; and
   responsive to a determination that the first subset has a recurring error associated therewith, correcting the recurring error associated with the first subset using the recurring error data for the group stored in the second subset.

2. The method of claim 1, wherein correcting the recurring error associated with the first subset includes:
   determining which memory cell in the first subset has the recurring error associated with the first subset associated therewith; and
   correcting a data value stored in the memory cell in the first subset determined to have the recurring error associated with the first subset associated therewith.

3. The method of claim 1, wherein the method includes:
   determining whether a third subset of the group of memory cells has a recurring error associated therewith using the second subset of the group of memory cells; and
   responsive to a determination that the third subset has a recurring error associated therewith, correcting the recurring error associated with the third subset using the second subset.

4. The method of claim 1, wherein the method includes, after correcting the recurring error associated with the first subset, correcting any non-recurring errors associated with the first subset of the group of memory cells using the second subset of the group of memory cells.

5. The method of claim 4, wherein the method includes correcting the non-recurring errors associated with the first subset of the group of memory cells using error correction code data for the first subset stored in the second subset of the group of memory cells.

6. An apparatus, comprising:
   a memory including a number of groups of memory cells; and
   a controller coupled to the memory and configured to:
      determine whether a first subset of a particular group of memory cells has a recurring error associated therewith using a second subset of the particular group of memory cells, wherein the second subset of the particular group of memory cells is configured to store data indicating a quantity of recurring errors associated with the particular group of memory cells, wherein the quantity of recurring errors associated with the particular group of memory cells is between zero and ten; and
      responsive to a determination that the first subset of the particular group of memory cells has a recurring error associated therewith, correct the recurring error using the second subset of the particular group of memory cells.

7. The apparatus of claim 6, wherein the second subset of the particular group of memory cells is configured to store data about each of the recurring errors associated with the particular group of memory cells.

8. The apparatus of claim 7, wherein the data about each of the recurring errors associated with the particular group of memory cells includes:
   which subset of the particular group has that respective recurring error associated therewith;
   which data stored in that subset of the particular group has that respective recurring error; and
   a correct value for the data stored in that subset of the particular group having that respective recurring error.

9. An apparatus, comprising:
   a memory including a group of memory cells configured to store data therein, wherein the group of memory cells includes a number of subsets of memory cells; and
   a controller coupled to the memory and configured to:
      determine whether the data stored in memory cells of a first subset of the number of subsets has a recurring error using the data stored in memory cells of a second subset of the number of subsets, wherein the data stored in the memory cells of the second subset includes:
         data indicating a quantity of recurring errors associated with the group of memory cells; and
         data about each of the recurring errors associated with the group of memory cells, wherein the data about each of the recurring errors associated with the group of memory cells includes:
            which subset of the group has that respective recurring error associated therewith;
            which data stored in that subset of the group has that respective recurring error; and
            a correct value for the data stored in that subset of the group having that respective recurring error; and
      responsive to a determination that the data stored in the memory cells of the first subset has a recurring error, correct the recurring error using the data stored in the memory cells of the second subset.

10. The apparatus of claim 9, wherein the data stored in the memory cells of the second subset includes:
    error correction code data for correcting non-recurring errors in each of the number of subsets; and
    additional data for correcting recurring errors in each of the number of subsets.

11. The apparatus of claim 10, wherein the controller is configured to correct the recurring error using the additional data.

12. The apparatus of claim 9, wherein the memory is dynamic access random memory.

13. The apparatus of claim 9, wherein the group of memory cells is a page of memory cells.

14. The apparatus of claim 9, wherein each of the number of subsets is configured to store 512 bits of data.

15. The apparatus of claim 9, wherein the memory is NAND flash memory.

16. A method for operating memory, comprising:
    determining whether data stored in a first subset of a group of memory cells has a recurring error using data stored in a second subset of the group of memory cells; and
    responsive to a determination that the data stored in the first subset has a recurring error:
       determining which of the data stored in the first subset has the recurring error using the data stored in the second subset; and
       determining a correct value for the data stored in the first subset that has the recurring error using the data stored in the second subset.

17. The method of claim 16, wherein the method includes changing the data stored in the first subset that has the recurring error to the correct value.

18. The method of claim 16, wherein the method includes storing the data stored in the second subset in a cache associated with the memory.

19. The method of claim 16, wherein the method includes:
    determining which of the data stored in the first subset has the recurring error using data about the recurring error stored in the second subset; and
    determining the correct value for the data stored in the first subset that has the recurring error using the data about the recurring error stored in the second subset.

20. The method of claim 16, wherein the method includes using a controller to:
    determine whether the data stored in the first subset has a recurring error;
    determine which of the data stored in the first subset has the recurring error; and
    determine the correct value for the data stored in the first subset that has the recurring error.

21. A method for operating memory, comprising:
    determining whether data stored in a first subset of a group of memory cells has a recurring error using the data stored in the first subset of the group of memory cells;

if the data stored in the first subset has a recurring error, correcting the recurring error using the data stored in the first subset;

determining whether data stored in a second subset of the group of memory cells has a recurring error using the data stored in the first subset; and if the data stored in the second subset has a recurring error, correcting the recurring error using the data stored in the first subset, wherein correcting the recurring error includes:

determining which memory cell in the second subset has the data with the recurring error stored therein; and correcting a data value stored in the memory cell in the second subset determined to have the data with the recurring error stored therein.

22. The method of claim 21, wherein determining whether data stored in the first subset of the group of memory cells has a recurring error includes:

determining whether a quantity of recurring errors in data stored in the group of memory cells is non-zero; and if the quantity of recurring errors in the data stored in the group of memory cells is non-zero, determining whether the data stored in the first subset of the group of memory cells has a recurring error.

23. The method of claim 22, wherein the method includes determining whether the quantity of recurring errors in the data stored in the group of memory cells is non-zero using data stored in the first subset of the group of memory cells indicating the quantity of recurring errors in the data stored in the group of memory cells.

24. The method of claim 21, wherein the method includes determining whether data stored in the second subset of the group of memory cells has a recurring error after correcting the recurring error in the data stored in the first subset of the group of memory cells.

25. The method of claim 21, wherein determining whether data stored in the second subset of the group of memory cells has a recurring error includes:

determining whether a quantity of recurring errors in data stored in the group of memory cells is non-zero after correcting the recurring error in the data stored in the first subset of the group of memory cells; and if the quantity of recurring errors in the data stored in the group of memory cells is non-zero, determining whether the data stored in the second subset of the group of memory cells has a recurring error.

\* \* \* \* \*